(12) United States Patent
Herbst et al.

(10) Patent No.: US 10,222,476 B2
(45) Date of Patent: Mar. 5, 2019

(54) SCANNING METHOD AND SURVEYING SYSTEM WITH SCANNING FUNCTIONALITY

(71) Applicant: LEICA GEOSYSTEMS AG, Heerbrugg (CH)

(72) Inventors: Christoph Herbst, Dornbirn (AT); Patrick Spettel, Langen bei Bregenz (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 185 days.

(21) Appl. No.: 15/147,889

(22) Filed: May 5, 2016

(65) Prior Publication Data

US 2016/0327647 A1  Nov. 10, 2016

(30) Foreign Application Priority Data

May 8, 2015  (EP) .................................... 15167033

(51) Int. Cl.
*G01S 17/42* (2006.01)
*G01C 15/00* (2006.01)
*G01S 7/481* (2006.01)
*G01S 17/89* (2006.01)
*G01S 7/48* (2006.01)

(52) U.S. Cl.
CPC ............ *G01S 17/42* (2013.01); *G01C 15/002* (2013.01); *G01S 7/4808* (2013.01); *G01S 7/4817* (2013.01); *G01S 17/89* (2013.01)

(58) Field of Classification Search
CPC ....... G01S 7/4817; G01S 17/89; G02B 26/10; G02B 26/127; G01B 11/002
See application file for complete search history.

(56) References Cited

U.S. PATENT DOCUMENTS

2014/0078519 A1\* 3/2014 Steffey .................. G01S 7/4817
356/625

FOREIGN PATENT DOCUMENTS

| CN | 101702200 A | 5/2010 |
| CN | 101865996 A | 10/2010 |
| WO | 2013/12826 A1 | 1/2013 |

OTHER PUBLICATIONS

European Search Report dated Oct. 29, 2015 as received in Application No. EP15167033.

\* cited by examiner

*Primary Examiner* — Luke D Ratcliffe
(74) *Attorney, Agent, or Firm* — Maschoff Brennan

(57) ABSTRACT

In some embodiments a scanning method for deriving information about surfaces of objects for a surveying system is disclosed. In some embodiments, the surveying system may include a control and evaluation unit with scanning functionality, such as, for example, a laser scanner or a total station. In some embodiments, the recorded point set of the detected object points is kept available in a volatile memory of the control and evaluation unit and by means of the control and evaluation unit as part of the scanning process an adaptation of the recorded point set is effected depending on at least one point density of the recorded point set. The adapted point set generated thereby, with loss of the recorded point set, is stored in a permanent memory.

21 Claims, 4 Drawing Sheets

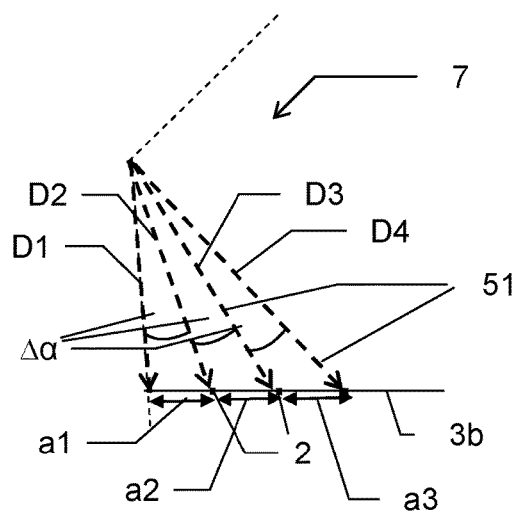
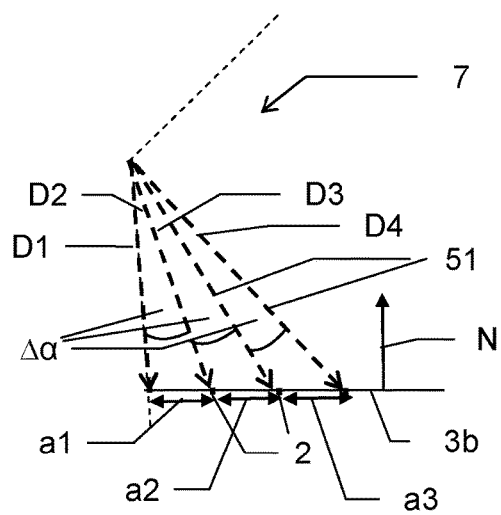
Fig 3a
Fig 3b
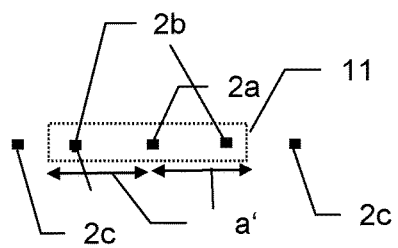
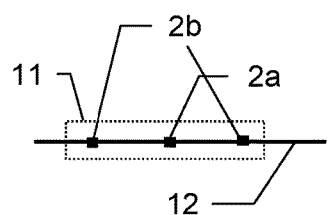
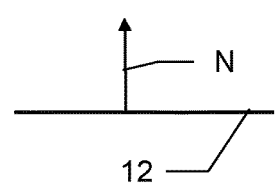
Fig 4a
Fig 4b
Fig 4c

SCANNING METHOD AND SURVEYING SYSTEM WITH SCANNING FUNCTIONALITY

FIELD OF THE INVENTION

The invention relates to a scanning method for deriving information about object surfaces for a surveying system with scanning functionality for spatially surveying objects and to a surveying system with scanning functionality.

BACKGROUND 3D scanning is a very effective technology for producing millions of spatial measurement points of objects within minutes or seconds. Typical measurement tasks are the recording of objects or the surfaces thereof such as industrial plants, house facades or historical buildings, but also accident sites and crime scenes. Surveying apparatuses with scanning functionality are, for example, total stations and laser scanners, such as the Leica P20 or Leica Multi Station 50, which are used to measure or create 3D coordinates of surfaces. For this purpose, they have to be able to guide the measurement beam of a distance measuring device over a surface and in the process simultaneously to detect direction and distance with respect to the measurement point. From the distance and the direction information correlated therewith for each point, a so-called 3D point cloud is generated by means of data processing.

In terms of the fundamental structure, such terrestrial scanners are thus designed to detect a distance to an object point as measurement point using a, usually electro-optical and laser-based, distance measuring device. A direction deflecting unit likewise present is in this case designed in such a way that the measurement beam of the distance measuring device is deflected in at least two independent spatial directions, as a result of which a spatial measurement region can be recorded. The deflecting unit can be realized in the form of a moving mirror or alternatively also by other elements suitable for controlled angular deflection of optical radiation, such as, for example, rotatable prisms, movable optical waveguides, deformable optical components, etc. The measurement is usually effected with determination of distance and angles, that is to say in spherical coordinates, which can also be transformed into Cartesian coordinates for display and further processing. The distance measuring device can be embodied for example according to the principles of time-of-flight (TOF), phase, waveform digitizer (WFD) or interferometric measurement. For fast and accurate scanners, in particular a short measurement time in conjunction with high measurement accuracy is required, for example a distance accuracy in the mm range or below with measurement times of the individual points in the sub-microseconds to milliseconds range. In this case, the measurement region ranges from a few centimeters up to a few kilometers.

The spatial measurement resolution is of particular importance in this case. It determines what details can still be identified, but also the duration of the scanning process and the volume of data obtained in the process. Measurement projects with modern high-speed scanners produce 3D point clouds having a cardinality of, for example, hundreds of millions or billions of object points and beyond. The storage, transmission and processing of the enormous volume of data associated therewith poses great challenges for hardware and software. For example, the execution speed of programs for evaluating the 3D data is greatly dependent on the number of scanning points. It would therefore be advantageous if only those points or data that are actually of relevance to the respective measurement task were recorded.

In the case of scanning processes according to the prior art, however, it is by contrast usually the case that the acquired volume of data is unnecessarily inflated. In the case of scanners according to the prior art, attempts are made to achieve a point distance predefined by the user with respect to a predefined distance, i.e. a predefined initiation, by means of angular deflection with equal steps, that is to say that a distance measurement is initiated in each case at identical angular distances. The desired point distance would thus be achieved, however, on all surfaces to be measured only if the scanner were situated at the midpoint of a sphere. In actual fact, in reality depending on the distance and alignment of the object surfaces there arise diverging point distances, including extremely small point distances and thus extreme point densities in the near region of the surveying apparatus, particularly at the zenith and around the installation location. Especially these near-region measurement points are usually not of interest at all, since e.g. the floor or the ceiling of the measurement environment do not constitute an object to be surveyed.

Additional data ballast results from the fact that in the case of very small measurement distances the point distances in the near region, on account of the defined angular distances, may be even smaller than the diameter of the measurement beam, and so such point distances lead to redundant measurements and therefore do not bring any gain in spatial resolution even in the case of inherently desired measurement objects. Furthermore, during a scan in part points are generated which, although inherently a plus in terms of spatial resolution, nevertheless usually constitute unnecessary data since they do not yield a genuine gain in information. This involves e.g. points on a (non-curved) plane since the latter is ideally sufficiently defined by three points (which do not lie on a straight line), for which reason a relatively small point density would be sufficient in such regions.

Consequently, with regard to volume of data and also scanning duration it is usually unnecessary and inefficient and therefore undesirable to detect the scanning region with the highest possible resolution. On the other hand, as a result, under certain circumstances, depending on distance to the scanner and setpoint resolution chosen, highly relevant regions are scanned with such a low spatial resolution that there is an information deficit. Such regions of particularly high relevance are e.g. edges, curved planes or other shape changes. It would be desirable for such highly relevant object locations to be scanned in a targeted manner with an increased point density or reduced distance between the 3D points compared with other regions of the 3D point cloud, in order that these are imaged with as much detail as possible.

The prior art discloses a multiplicity of methods by which, in post-processing, after conclusion of the measurement and using external powerful computers, the data of the 3D point cloud can be processed, e.g. by filtering, smoothing or interpolation. However, e.g. a computational increase in the accuracy of the 3D points is possible or helpful only to a limited extent, since e.g. the profile of discontinuous locations such as object edges remains speculative. Furthermore, it is disadvantageous that superfluous data also have to be stored until then and processed, such that e.g. the requirements made of the data processing capacities of the surveying apparatus or the time expenditure for data transfer and processing until the conclusion of post-processing still remain very stringent.

By contrast, WO 2013/12826 discloses a method for a stationary laser scanner for data handling in real time, i.e. actually during data recording in the course of scanning. This involves carrying out, in the course of the scan, an areal segmentation of the 3D raw data into individual layers with a lattice structure passing through the layers for a respectively separate coding of the measurement components distance to the surface point, (both) alignment angles of the measurement beam and intensity of the received measurement radiation. The Codec for data transformation and compression is preferably a ZIP compression algorithm for distance and alignment angles and a JPEG compression algorithm for the intensity. For the intensity, the disclosure of WO 2013/12826 considers a compression of the data, which is associated with a partial loss of information or precision, as is the case when using a JPEG compression algorithm. By contrast, the disclosure of WO 2013/12826 explicitly teaches that the compression of the further components (distance, angles) is effected without loss of information or precision, as e.g. in the case of a compression based on a ZIP algorithm. In other words what is carried out (with the exception of the data concerning the intensity) is lossless storage of the data and hence no reduction of the data in the actual sense. That is to say that, disadvantageously, inherently unnecessary or undesired data are not sorted out, rather the volume of data to be stored or transferred is merely reduced by skilful organization and compression of the data. Sorting out scanned points is disclosed in WO 2013/12826 only for the case where the scanning speed is not optimally coordinated with the segmentation of the data, such that without sorting out the data organization structure would be disturbed, e.g. if a line of the structure lattice were otherwise filled doubly on account of an excessively low scanning speed. The scan data are thus adapted to the lattice structure serving for data segmentation, while the lattice structure remains strictly fixed. Apart from this exception, i.e. in the case of an optimum or error-free scan, the final data of the 3D points that are stored in the read only memory correspond to the directly recorded point data in terms of contents.

SUMMARY

Some embodiments of the present invention provide an improved scanning method for a surveying system with scanning functionality.

Some embodiments of the present invention provide a scanning method in which the information content of the scan can be influenced in real time and in a targeted manner.

Some embodiments of the present invention provide a scanning method by which the amount of scan data can be influenced in a targeted manner.

Some embodiments of the present invention provide a scanning method by which scanning regions or regions of interest that are in deficit can be ascertained and improved on site.

Some embodiments of the present invention provide a scanning method in which the resolution of the scan can be harmonized over the scanning region.

Some embodiments to provide a surveying system with scanning functionality for carrying out such a method.

The invention relates to a scanning method for deriving information about surfaces of objects for a surveying system comprising a control and evaluation unit with scanning functionality. Preferred examples of such a surveying system are a laser scanner or a total station. A first recording of a point set composed of detected object points that are detected by means of a measurement beam, e.g. a laser beam, is effected by means of a scanning process. In this case, one or a plurality of objects is or are scanned by continuously changing the alignment of the measurement beam in accordance with a known first scanning pattern and scanning region, wherein the respective distance to the object point and the respective alignment of the measurement radiation emitted for a distance measurement are determined. According to the invention, the recorded point set of the detected object points, that is to say the totality of all scanned points of the objects in the scanning region, is kept available in a volatile memory of the control and evaluation unit. Before storage in a permanent memory by means of the control and evaluation unit as part of the scanning process an adaptation of the recorded point set is effected, as a result of which an adapted, in particular reduced, point set is generated. In this case, the adaptation is effected depending on at least one point density of the recorded point set. Only the adapted point set is stored in the permanent memory in the case of along with final loss of the recorded point set.

In accordance with the method, therefore, the recorded point set is adapted before it is actually permanently stored, and so the present method is a real-time method. To put it another way, according to the invention, an adapted point set is generated from the directly generated point set, wherein only the adapted point set is permanently stored. As a criterion on the basis of which the adaptation is performed, use is made here of a point density of the recorded point set, i.e. the density of the scanned object points of the entire scanning region or of parts thereof, that is to say of individual subregions.

The adaptation comprises any alteration of the recorded point set depending on a point density. A reduction is preferably involved, such that the adapted point set is reduced in comparison with the recorded point set, as a result of which the adapted point set has fewer data than the recorded point set, and the amount of data that has to be stored in a read only memory is thus smaller than without application of the adaptation. The adaptation is preferably already effected during the measurement data acquisition.

The adaptation is effected, for example, by the point density itself being adapted, for example reduced by thinning out and/or averaging, within at least one predetermined partial region of the scanning region in accordance with predetermined selection criteria. Such a subregion is e.g. a region in or around the nadir of a laser scanner, for example within an angle +30° to −30°. In this region, which is very close to the laser scanner, the point density is generally particularly high, wherein such a region is at the same time generally of little interest for the surveying task, since the ground on which the scanner is situated normally need not actually be scanned. Therefore, within the partial region, e.g. simple thinning-out is effected on the basis of the order of the object points, e.g. by only every fifth or tenth object point of a scanning line, depending on the chosen resolution and thus angular step size, being maintained and the rest being discarded. Therefore, e.g. only every fifth or tenth scanning point is included in the adapted point set and the remaining objects points of the region are finally erased. Alternatively, by way of example, an average value of all or of a portion of the object points of the partial region is ascertained and this is recorded instead of the recorded points in the adapted point set. With application of such an adaptation criterion defined "regardlessly" from the outset, it is thus not necessary to explicitly determine the point density of the recorded point set of the subregion. This is possible without great uncertainty since the distance to the object, that is to say predominantly the ground, in such a subregion around the nadir varies only little and hence the point density actually present fluctuates only little with respect to a predefined setpoint resolution or can be deemed virtually to be previously known.

Additionally or alternatively, the adaptation is effected depending on at least one point density indicator of the recorded point set, said at least one point density indicator being ascertained on the basis of the determined distances and alignments as part of the scanning process. The point density indicator is optionally ascertained as soon as possible, i.e. already during the scanning process in real time in relation to already detected object points or scanned partial regions of the scanning region. As a further option, the point density indicator is based on estimated spatial distances between detected object points, wherein the point distances are ascertained for example on the basis of the distance to an object point and the angle between the two alignments of the measurement beam with respect to said object point and a neighboring object point. The point density indicator is used, for example, to check point by point or region by region whether a previously defined maximum value for the point density is exceeded, that is to say a resolution that is regarded as unnecessarily high is present at a location of the scanning region. By way of example, the user desires a resolution of 20 mm at 10 m, but a resolution going beyond that of 5 mm at 10 m is established in one or a plurality of regions on the basis of the point density indicator. In this case, that is to say when the maximum or limit value is exceeded, an adaptation of the recorded point set in the form of reduction of the point set in relation to the corresponding point or region is effected, e.g. by averaging or thinning out, that is to say omission of object points. In this case, the adaption is effected for the entire scanning region, or the scanning region is decomposed into individual regions or the entire recorded point set is decomposed into individual point sets, and the adaptation is carried out separately in each case for the individual regions. The number of points to be discarded or erased is in this case optionally defined proportionally to the size of a respective partial region. As a further option, in the adaptation further criteria or parameters are taken into account such as, for example, the quality of the measurement values of a respective object point, e.g. the signal-to-noise ratio thereof. In this case, object points having a poor signal-to-noise ratio are not included in the adapted point set or points having a particularly good signal are preferably maintained.

As a further option, determining a neighborhood set representing object points neighboring one another is effected. Neighboring object points are, for example, in each case two object points with the smallest distance between one another, or all the object points which have a distance below a certain limit with respect to an object point or a specific number of object points which have the smallest distance with respect to a selected object point, that is to say for example the three object points with the three smallest distances.

On the basis of the neighborhood set, as a further option, object surfaces and the associated surface normals thereof are estimated, i.e. a type of real-time geometry identification is carried out, e.g. by a mathematical plane being placed through all the points of a neighborhood set, or by other approximation methods. The surface normals are optionally used when ascertaining the point density indicator, for example by the alignment of the respective estimated surface with respect to the measurement beam being calculated therewith. With this ascertained alignment, together with the distance and the direction of the measurement beam, the distribution on the surface, the distances between the points and the point density of the surface are determined comparatively precisely, depending on the relative position of the surface significantly more accurately than merely with the use of distance and angle between two alignments of the measurement beam relative to two neighboring object points. As the point density indicator, by way of example, use is then made of an estimated point density per surface or an averaged point density for a multiplicity of surfaces.

In one development of the method according to the invention, an information gain indicator for scanned object points is determined, which indicates the gain in information about the surface of a respective object that is obtained by means of the respective object point. In other words, such an information gain indicator is a measure or estimation of each object point or e.g. a neighborhood set of object points as to what information content it carries (contributes). In this regard, the information-laden value of the object points of a (non-curved) plane is relatively low, since a plane is known sufficiently accurately by a small number of points, ideally only three points. By contrast, the gain in information is relatively high in the case of a curved surface through most or all of the detected points, since an arbitrarily curved surface is known all the more accurately, the more points are covered by it. Likewise, the points at discontinuities or corners or edges of objects are of great importance for deriving information about this object and thus with a high information gain indicator. The information gain indicator is optionally ascertained during the scanning in real time for object points already scanned and is optionally ascertained on the basis of the estimated object surfaces as described above, in particular depending on a variance of normal distances of object points of a neighborhood set with respect to the object surface estimated with respect thereto. A high variance of the normal distances is an indication of a high information gain indicator, since this indicates that the surface estimated from the neighborhood set represents a great averaging of the points of the neighborhood and these points thus lie for example in the region of a discontinuity or curvature/edge.

As an option, the adaptation of the recorded point set is effected depending on the information gain indicator, for example by such points whose information gain indicator exceeds a predetermined threshold value being transferred as part of the adapted point set into the permanent memory. By contrast, object points with a low information gain indicator or an information gain indicator equal to zero are erased at least down to some of these object points, as a result of which the point density of the adapted point set is reduced without (significant) information about the object surfaces being lost. Alternatively or additionally, an adaptation is effected as described above on the basis of a point density indicator, wherein in addition the point density in regions having an undesirably high point density is reduced by the erasure of a fixed number of points, and points with a high information value are maintained in this case in a targeted manner. With the aid of an information gain indicator according to the invention, therefore, the point density can be kept high in a targeted manner in information-rich parts of the scanning region, while it can be greatly reduced in less information-laden or relevant regions, as a result of which fewer data have to be transferred into the permanent memory. Generally, averaging or interpolation is optionally effected before discarding points, as a result of which the information of such points is not completely lost, but rather is maintained in reduced form.

In one development of the method according to the invention, a selection of at least one region of interest from the scanning region is effected. This selection is effected depending on the point density indicator and/or information gain indicator. In this case, a check is optionally made region by region on the basis of the point density indicator and/or the information gain indicator to establish whether a predetermined minimum point density is achieved and/or a predetermined threshold value for the information gain indicator is exceeded for the respective region. Thus, by way of example, regions of particularly high or low point density and/or information content can be identified and e.g. displayed to the user on site on a display of the surveying system. This enables e.g. indications of erroneous or incomplete scanning, or an adaptation of the recorded point set to the effect that the point density within such a region of interest is adapted in a targeted manner, in particular is increased in the case of a region having a conspicuously low point density. By way of example, it is thus also possible to match or harmonize the point density over the entire scanning region or partial regions with a certain fluctuation range striven for, by the point density being increased at some locations and correspondingly decreased at other locations.

Moreover, the selection according to the invention of regions of interest actually on site makes it possible to increase the point density or the resolution or the degree of detail of the surface information by targeted second recording of object points with a higher resolution or smaller angular steps than in the first recording. Therefore, in one development of the method according to the invention, a second recording is effected in accordance with a second scanning pattern and second scanning region, wherein the second scanning region is defined depending on the region of interest (ROI), in particular corresponds thereto, and the second scanning pattern is closer-meshed than the first scanning pattern. In this case, the second recording is optionally effected automatically. The object points recorded in this case are taken into account in the adaptation of the (originally) recorded point set, for example by their being inserted into the adapted point set in addition or as an alternative to the initially detected object points of the relevant region.

Consequently, the method according to the invention affords the advantage that a targeted improvement of the scanning result is made possible actually on site. As a result, it is possible to avoid a situation in which regions which are of great importance but whose point density or resolution is below a resolution desired by the user occur in the scanning result. By virtue of the method according to the invention, particularly relevant regions, for example those which have greatly irregular surfaces or many transitions, can be scanned in a targeted manner with high resolution or with the highest possible resolution. This is particularly advantageous since high-resolution scanning over the entire scanning region in accordance with the prior art, that is to say without specific selection of regions of interest, is very time-consuming and produces an unnecessarily large amount of data. It is furthermore advantageous that, by means of the determination of regions of interest according to the invention, therefore, even fewer experienced users, in a targeted manner, can be made aware of particularly relevant regions of the measurement embodiment or guided in the scanning task or, in the case of a fully automatic adaptation of the point set, weak points or regions of the point set that merit improvement are automatically eliminated and the scanning result is thus automatically optimized.

Generally, the method according to the invention affords the advantage that this enables optimization of the point set to be stored actually on site, as it were "on the fly". In particular, unnecessary data ballast is immediately eliminated by virtue of the fact that only those points or data which are actually of relevance to the user are permanently recorded, or at least the extent of irrelevant or not very relevant points or data is drastically restricted in comparison with known methods. By way of example, excessively increased point densities in the ground region of the laser scanner can be avoided by the point density being hugely thinned out by erasure of many ground points. Consequently, the demand for read only memory or the requirements made of the hardware and transmission capacity or transmission time is or are reduced from the outset, whereas with methods according to the prior art a data reduction is possible only by means of post-processing, i.e. afterward. The method according to the invention enables a more cost-effective and more efficient accomplishment of scanning tasks or of the further processing of the data obtained in the process.

The present invention furthermore includes a computer program product or computer data signal, embodied by an electromagnetic wave, comprising program code, for controlling or carrying out the method according to the invention.

The present invention additionally relates to a surveying system with scanning functionality, in particular a laser scanner or a total station. The surveying system comprises a control and evaluation unit. In this case, according to the invention, the control and evaluation unit is designed for performing the scanning method according to the invention.

BRIEF DESCRIPTION OF THE DRAWINGS

The method according to the invention and the device according to the invention are described in greater detail below on the basis of the embodiments and application processes illustrated schematically in the drawings.

Specifically in the figures.

DETAILED DESCRIPTION

Figure 1:
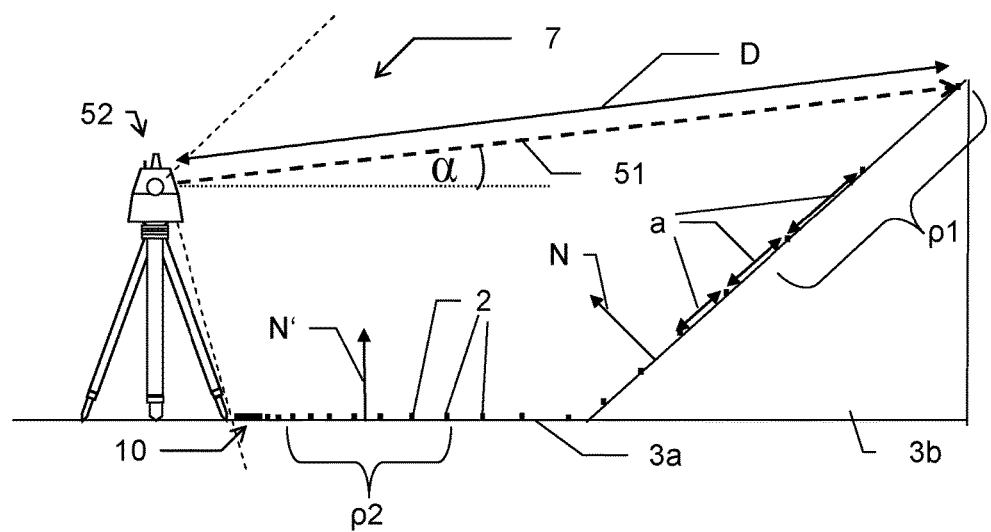
FIG. 1 shows a side view of a surveying system with scan objects.

FIG. 1 shows in a side view a surveying system 52, for example designed as an automated total station or as a laser scanner comprising a control and evaluation unit. The surveying system 52 scans objects 3a, 3b of its measurement environment within a defined scanning region 7 by means of a measurement beam 51, e.g. a laser beam, the alignment or target direction of which is continuously changed in accordance with a first known scanning pattern. Individual object points 2 are thus detected, wherein the respective distance D to the object point and the respective alignment of the measurement beam 51 in relation to two measurement axes or two angles are determined. The scanning process thus produces a point set containing three-dimensional information about the surface of the scanned objects 3a, 3b. For the sake of simplicity, however, the illustration in FIG. 1 is only two-dimensional, and so a linear arrangement of scanned object points 2 instead of the actual areal distribution and only the elevation angle α as one of the two alignment angles are depicted.

In the case of surveying systems 52 in the prior art, the continuous change in the alignment of the measurement beam 51 is effected with equal steps, wherein the step size is predefinable e.g. by the user (within certain limits), for example by said user defining a desired point density ρ, e.g. that a spatial resolution, i.e. a distance a between the scan points 2, of 1 cm at a distance of 30 m is intended to be achieved. The control and evaluation unit derives the required angular step sizes from these stipulations.

On account of the real measurement conditions, the situation is then such that in the case of uniform alterations e.g. of the elevation angle α, the distance a between the object points is dependent on the distance D between the surveying apparatus 52 and the object 3a, 3b and on the alignment of the object 3a, 3b with respect to the surveying apparatus 52 or measurement beam 51. In this regard, the distance a between the object points in the configuration illustrated in FIG. 1 increases to an increasing extent with the distance D. The point density ρ1, ρ2 actually achieved thus varies with the distance D and the alignment of the respective surface normals N, N' of an object surface with respect to the measurement beam 51. In this regard, in two exemplary partial regions of the scanning region 7, a (relatively) high (averaged) point density ρ2 is present in the near region at the nadir of the surveying system 52 and a (relatively) low (averaged) point density ρ1 is present in the far region.

A relatively high point density ρ2 and thus relatively high resolution is achieved with regard to the object 3a, which is the ground on which the surveying system 52 is situated. However, precisely such ground regions of the scanning region 7 are generally the least relevant to the measurement task, such that the data obtained thereby or parts of the recorded point set at least partly constitute unnecessary data ballast. By contrast, the desired resolution set may be too low for more distant, but relevant objects (e.g. parts of object 3b situated further back), such that these are not scanned with a sufficient degree of detail. This could only be avoided by setting a high or higher resolution from the outset, but—as explained—this further inflates the data ballast in the near region. In this case, depending on the predefined measurement setting it may even happen that the point distances a in the absolute near region 10 at the location of the laser scanner are smaller than the diameter of the measurement beam 51, as a result of which the data or points generated thereby are additionally superfluous because they are redundant. Scanning methods according to the prior art disadvantageously do not allow such data ballast to be directly "jettisoned", rather the undesired points or data are permanently stored on a permanent memory like all other points or data and are possibly only deleted after the conclusion of the scanning process in post-processing. In other words, in the prior art the recorded point set is completely transferred to a read only memory.

Figure 2:
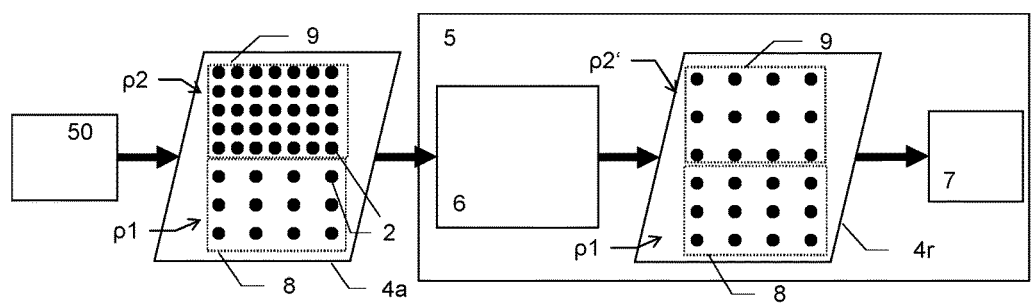
FIG. 2 schematically shows a first example of the scanning method according to the invention, FIGS. 3a, b schematically show an example of ascertaining a point density indicator, FIGS. 4a-c schematically show an example of ascertaining an object surface normal, FIGS. 5a, b schematically show an example of ascertaining an information gain indicator, FIG. 6 schematically shows a second example of the scanning method according to the invention, FIG. 7 schematically shows an example of one development of the scanning method according to the invention.

FIG. 2 schematically shows the scanning method according to the invention. From a scanning module 50 of the surveying apparatus, the recorded point set 4a obtained by the above-explained scanning of objects by means of the measurement beam passes into a volatile memory 6 of the control and evaluation unit 5 of the surveying system. In the example, the recorded point set 4a contains a first region 8 having a relatively low point density ρ1 and a second region 9 having a relatively high point density ρ2. In contrast to the low point density ρ1 in the example the high point density ρ2 is regarded as excessively high, e.g. because it belongs to the region of the ground around the laser scanner or is greater than a previously defined setpoint point density or than a previously defined maximum value for the point density.

Therefore, the recorded point set is adapted depending on the point density by the point density ρ2 of the second region 9 being reduced to a lower point density ρ2'. In the example, the reduction is effected by a thinning out of the point set in the second region 9 by omitting every second object or scanning point 2. Alternatively, a reduction of the point density can be effected by averaging or depending on the ascertained distance of the object points 2 with respect to one another. An adapted point set 4r is generated by the adaptation. In the example, the adapted point set 4r has an overall lower point density compared with the recorded point set 4a, wherein the adaptation is moreover effected in such a way that all the regions 8, 9 have an identical point density: ρ2'=ρ1.

The adapted point set 4r is stored in a permanent memory 7, which is likewise part of the control and evaluation unit 5 in the example. By contrast, the recorded point set 4a does not find entrance into the permanent memory 7, as a result of which it is finally lost after the conclusion of the adaptation or the scanning process, since it is stored only in the preliminary buffer memory 6 and thus temporarily. The adaptation illustrated in the example constitutes a reduction of the recorded point set, as a result of which the adapted point set advantageously requires less memory space in the read only memory 7 than would be required by the recorded point set 4a.

As an option, the adaptation depending on a point density is effected depending on a point density indicator. The point density indicator represents a measure of the point density of a certain location or region of the recorded point set.

FIGS. 3a and 3b show examples of a point density indicator according to the invention and the ascertainment thereof. In FIG. 3a, for each individual object point 2 of the object 3b, the distance a1-a4 to its nearest neighbor is estimated by formation of a ratio of the angular difference or angular step size Δα of the elevation angle α at which the measurement beam 51 is emitted to the respective distance D1-D4. This estimated distance a1-a4 then serves as a point density indicator. Instead of using only the distance a1-a4 to its nearest neighbor, alternatively use is made of the distances to a defined number of nearest neighbors and/or the nearest neighbors of an object point within a defined circumscribed circle. As a further alternative, instead of being ascertained for individual object points 2, a point density indicator can also be ascertained region by region for defined individual regions of the scanning region 7 or a defined number of object points 2.

FIG. 3b shows an improved variant of an ascertainment of a point density indicator according to the invention. In comparison with the procedure according to FIG. 3a, in addition the alignment of the surface of the object 3b or of the surface normal N thereof relative to the alignment of the measurement beam 51 is determined in the manner as described below with regard to FIGS. 4a-c and is used for ascertaining the point density indicator. By taking account of the relative alignment of the surface or the surface normal N thereof with respect to the measurement beam direction, a respective point distance a1-a4 is determined more accurately than by the method according to FIG. 3a. As a result, a point density indicator of higher quality is present, on the basis of which the adaptation can be performed more exactly or with a more accurate fit.

FIG. 4a to FIG. 4c show an example of the ascertainment of a surface normal N with the aid of the detected object points on the basis of a neighborhood set. As in the previous examples, the illustration is a simplifying two-dimensional side view. For a respective object point 2a, a neighborhood set 11 is determined, which represents object points neighboring the object point 2a (FIG. 4a). In the example, those object points 2b whose distance a with respect to the object point 2a is less than a predefined maximum distance a' are regarded as being associated with the neighborhood set 11. Correspondingly, in the example, the object points 2c do not belong to the neighborhood set 11 since their distance with respect to the object point 2a is greater than the maximum distance a'. Alternatively, a neighborhood set 11 is defined on the basis of other criteria, e.g. as a set of defined cardinality of the points with the smallest Euclidian distance with respect to the object point 2a.

A surface or plane 12 is subsequently estimated on the basis of the neighborhood set 11 of the neighboring object points 2a and 2b (FIG. 4b). The surface ascertainment is effected for example by fitting a plane 12 on the basis of the object points 2a and 2b by mathematical methods known to the person skilled in the art. Finally, the surface normal N of the plane 12 is calculated (FIG. 4c). If the estimation of the surface is not effected by means of determining a mathematically exact plane, but rather is effected by means of some other modeling, the surface normal N is for example an average value of a plurality of individual surface normals.

Figure 5A:
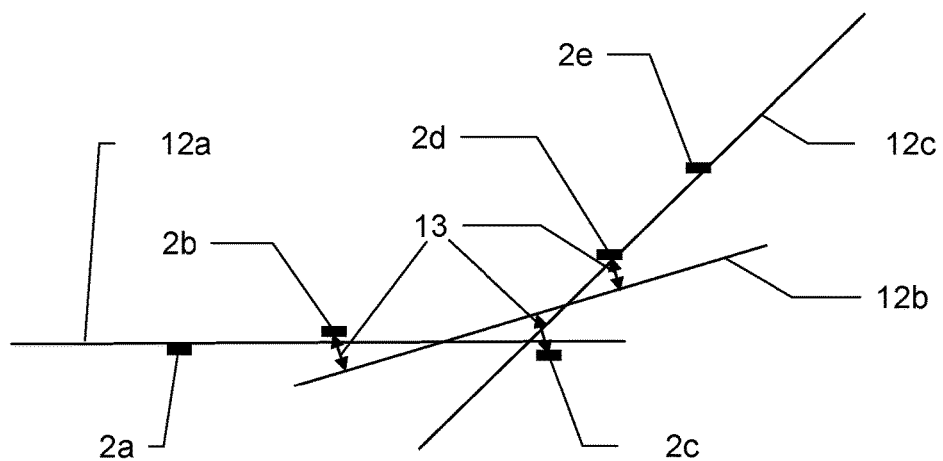
Figure 5B:
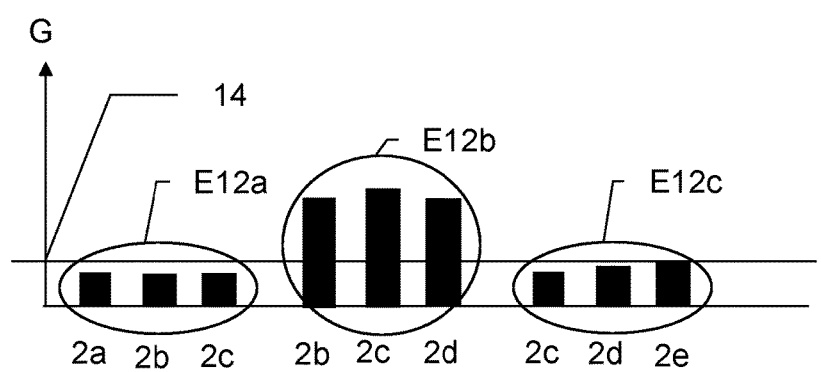

FIGS. 5a and 5b show one development of the method according to the invention. The relevance of the individual scanned object points to the sought information about the object surfaces is different. Since three points that do not lie on a straight line suffice e.g. for unambiguously defining a plane, two (relative to the two-dimensionality of the illustration in FIG. 4a) of the scanning points 2a-2c suffice in the example according to FIG. 4a. The rest of the object points 2a-2c do not bring any gain in information about the surface 12 (see FIG. 4b). Therefore, an information gain indicator is optionally determined, which expresses the relevance of the individual object points or sets or groups of object points.

FIG. 5a illustrates five object points 2a-2e, wherein, in contrast to FIGS. 4a-4c, said object points do not all lie along a straight line, but rather are distributed. Therefore, three estimated surfaces 12a-12c result following the procedure described with regard to FIGS. 4a-4c. Afterward, the (normal) distance of the respective points 2a-2e with respect to the planes 12a-12c with which they are associated is determined. Since the object point 2c lies at an edge, it and the neighborhood points 2b and 2d have a normal distance 13 that is relatively large. By contrast, the object points 2a-2c have a small normal distance or ideally no distance (the latter is therefore not depicted) with respect to the surface 12a since the object point 2b is situated "in the middle" in the surface 12a. This correspondingly applies to the plane 12c and the associated object points 2c-2e neighboring one another.

FIG. 5b schematically shows the respective information gain indicator G. Relative to the plane 12b from FIG. 5a, the points 2b-2d have a comparatively high information gain indicator G. By contrast, the respective information gain indicator G of the points 2a-2c relative to the plane 12a and of the points 2c-2e relative to the plane 12c is relatively small or, in relation to a minimum value or threshold value 14 derived e.g. from the signal-to-noise ratio, negligible. In this case, the respective information gain indicator G is derived either e.g. directly from the respective normal distance or taking account of a variance of the normal distances of the object points associated with a respective surface.

Figure 6:
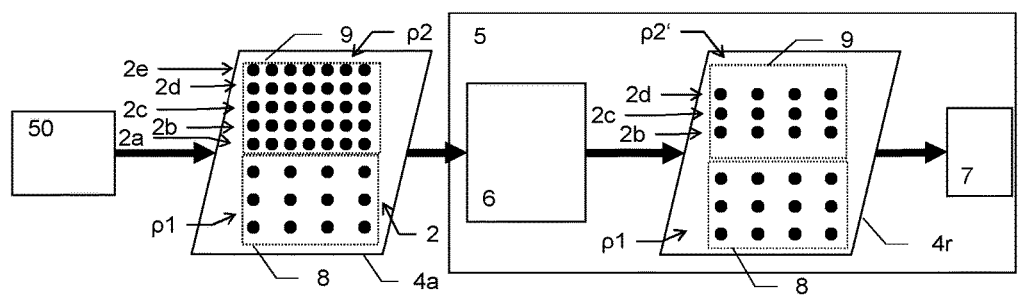

FIG. 6 shows an example in which the information gain indicator G ascertained according to FIGS. 5a and 5b is taken into account in the adaptation of the recorded point set 4a. FIG. 6 is analogous to FIG. 2. In this case, the object points of the second region 9 are assigned to the object points 2a-2e from FIG. 5a, wherein each line of the region corresponds to a repetition of the respective object point, e.g. 2a, into the plane of the drawing in FIG. 5a. In other words, the lines of the object points 2c-2e are associated with the surface 12c from FIG. 5a, the lines of the object points 2a-2c are associated with the surface 12a, and the line of the points 2c corresponds to the edge between the two surfaces. In the example, the scanning points 2 of the first region 8 are regarded as likewise being associated with the surface 12a.

In a modification of the adaptation of the recorded point set 4a according to FIG. 2, this is now also effected depending on the information gain indicator. Since, as described with regard to FIGS. 5a and 5b, the information gain indicator of the points 2a and 2e everywhere is small or equal to zero, all these points, in contrast to the method according to FIG. 2, are not accepted into the adapted point set 4r. The scanning points 2b-2d have (at least in relation to at least one surface) a high information gain indicator, for which reason these points are included in the adapted point set 4r. As an option, in this case, as illustrated in FIG. 6, a thinning out is additionally also effected within the points having a high information gain indicator, by every second column being erased, since the distances between the respective points 2b-2d in each line or the point density along a respective line of the recorded point set exceed(s) a defined maximum value. In this case, optionally e.g. the fluctuation of the information gain indicator between neighboring points of a line can be taken into account by all these neighboring points being maintained in the case of a large fluctuation. Alternatively, all the scanning points 2b-2d having a high information gain indicator are included in the adapted point set in any case and independently of other selection criteria, in order to obtain no loss of relevant object points whatsoever.

Since, in the example, it is assumed that all the points 2 of the first partial region 8 are associated with the plane 12a from FIG. 5a, in an alternative (not illustrated) points 2 of the first partial region 8 are also sorted out since they generally have a small information gain indicator or the first region overall has a small (average) information gain indicator. By way of example, a strict column-by-column and/or line-by-line erasure of object points 2 is then effected or only the points 2 having a very good signal-to-noise ratio, that is to say the "highest-quality" points, are maintained and included in the adapted point set 4r. Furthermore, it is possible to maintain the number of points to be discarded proportionally to the size of a respective partial region 8, 9, or a fixed number of points per estimated object surface.

As explained, the reduction of the point density ρ2 is thus effected in such a way that in a targeted manner object points of little relevance are sorted out or in a targeted manner points having a high information content are selected and become part of the adapted point set.

Figure 7:
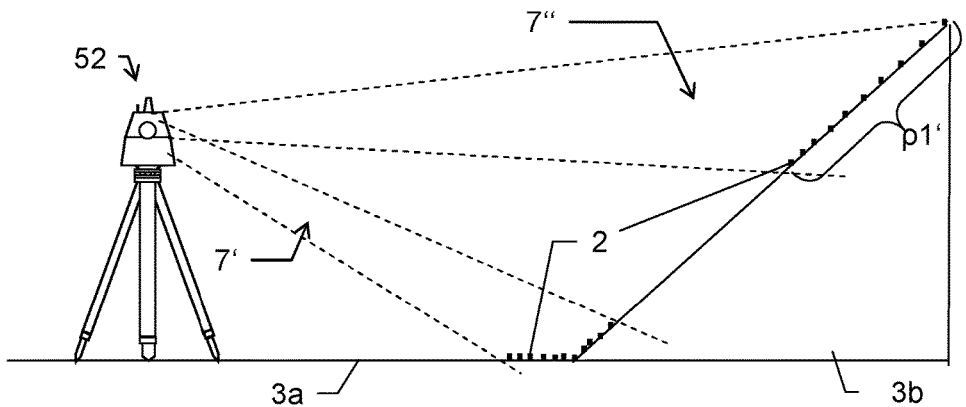

One development of the method according to the invention is described with reference to FIG. 7, in which development a region 7', 7" of interest is selected depending on the point density indicator and/or the information gain indicator. The selection is effected e.g. to the effect of whether a specific minimum point density is present at a location or a partial region of the scanning region, or to the effect of whether the information gain indicator of a location or of a partial region exceeds a predetermined threshold value. In other words, what are sought are locations or regions having point densities which do not attain a defined setpoint point density and/or locations or regions having a particularly high information gain indicator and thus high relevance such as e.g. edges or curved surfaces. The selection is effected as part of the scanning method according to the invention, such that regions of interest 7', 7" found in this way can then be displayed to a user on a display of the surveying system e.g. while still on site or actually during the scan for already detected partial regions or objects, as a result of which the user while still on site can identify particularly relevant zones or zones with inadequate scan resolution.

For such regions, as a further development, the recorded point set is adapted by the point set being increased. This is effected e.g. by a second recording of additional or further object points 2 within the respective region of interest 7', 7" being effected by the user or automatically. By way of example, as illustrated in FIG. 7, the region 7' around the boundary of the two objects 3a, 3b is scanned again since such a boundary region is of particular importance for the scanning task. As a further region 7", the far region on the object 3b is recorded since this region was detected with only relatively low resolution during the first recording on account of the relatively large distance and inclination of the object 3b. The respective regions 7', 7" are recorded with a second scanning pattern, which is closer-meshed in comparison with the first scanning pattern of the first recording. In other words, the second recording is carried out with a smaller angular step size than during the first time. Accordingly, for these partial regions 7', 7" an increased point density results in comparison with the point density of the point set recorded during the first time in said regions 7', 7" (c.f. FIG. 1; thus e.g. ρ1'>ρ1). For these regions of interest 7', 7", an adaptation of the (originally) recorded point set is then effected by the points obtained during the second recording being inserted into the recorded point set. Alternatively, a further adaptation of the point set already adapted by a first adaptation is effected. In this case, the new points are used in addition or as an alternative to the original points. As an alternative for a second recording, for the region 7" it is conceivable to increase the resolution "artificially" by corresponding algorithms. However, this procedure is less suitable for regions 7' having discontinuities. As a further alternative or further addition, in the selection of a region of interest it is also possible to take account of further criteria, such as e.g. the signal-to-noise ratio of the recorded object points or the type of scanned object 3a, 3b.

In this development according to the invention, therefore, generation of an adapted point set (in addition or as an alternative to the abovementioned adaptation methods) is effected by the point density and thus the resolution of particularly relevant or inadequately detected regions being improved in a targeted manner. The fact that the adaptation according to the invention is part of the scanning process, and is effected as it were in real time, makes it possible while still on site to eliminate weak points of a scan and/or to achieve significant and targeted increases in the degree of detail, without accepting unnecessary data ballast.

What is claimed is:

1. A scanning method for deriving information about surfaces of objects for a surveying system with scanning functionality comprising a control and evaluation unit, wherein a first recording of a point set composed of object points detected by means of a measurement beam of the surveying apparatus is effected by means of a scanning process comprising:

scanning objects by continuously changing the alignment of the measurement beam in accordance with a known first scanning pattern and first scanning region, determining the respective distance to the object point and the respective alignment of the measurement radiation emitted for a distance measurement, wherein:

the recorded point set of the detected object points is kept available in a volatile memory of the control and evaluation unit and prior to storage in a permanent memory by means of the control and evaluation unit as part of the scanning process an adaptation of the recorded point set is effected depending on at least one point density of the recorded point set, as a result of which an adapted point set is generated, and, along with final loss of the recorded point set, only the adapted point set is stored in the permanent memory, wherein ascertaining at least one point density indicator for the recorded point set is effected on the basis of the determined distances and alignments and the adaptation is effected depending on the point density indicator.

2. The method according to claim 1, wherein:
the adaptation is effected by the point density itself being adapted within at least one predetermined partial region of the scanning region in accordance with predetermined selection criteria.

3. The method according to claim 1, wherein:
ascertaining the point density indicator is effected during the scanning process in real time in relation to object points already detected and/or
the point density indicator is based on estimated spatial distances of detected object points.

4. The method according to claim 3, wherein:
the adaptation is effected in such a way that on the basis of the point density indicator a check is made point by point or region by region to establish whether a previously defined maximum value for the point density is exceeded and, in the case of the maximum value being exceeded, the point density is reduced by means of thinning out or averaging in relation to the corresponding point or region.

5. The method according to claim 3, wherein:
the adaptation is effected in such a way that on the basis of the point density indicator a check is made point by point or region by region to establish whether a previously defined maximum value for the point density is exceeded and, in the case of the maximum value being exceeded, the point density is reduced.

6. The method according to claim 3, wherein:
a selection of at least one region of interest (ROI) from the scanning region is effected depending on the point density indicator, wherein in the context of the selection on the basis of the point density indicator a check is made point by point or region by region to establish whether a predetermined minimum point density is present.

7. The method according to claim 1, wherein:
determining a neighborhood set representing neighboring object points is effected in the context of ascertaining the point density indicator.

8. The method according to claim 7, wherein:
on the basis of the neighborhood set object surfaces and associated surface normals are estimated and the surface normals are used for ascertaining the point density indicator.

9. The method according to claim 1, wherein:
an information gain indicator for scanned object points is determined, which indicates the gain in information about the surface of a respective object that is obtained by means of the respective object point, wherein
the adaptation is effected depending on the information gain indicator of a respective scanned object point, wherein specifically object points whose information gain indicator exceeds a predetermined threshold value are transferred as part of the adapted point set into the permanent memory, and/or
ascertaining the information gain indicator is effected during the scanning in real time for object points already scanned.

10. The method according to claim 9, wherein:
the information gain indicator is determined on the basis of the estimated object surfaces.

11. The method according to claim 9, wherein:
a selection of at least one region of interest (ROI) from the scanning region is effected depending on the information gain indicator, wherein in the context of the selection on the basis of the information gain indicator a check is made point by point or region by region to establish whether the respective information gain indicator exceeds a predetermined threshold value.

12. The method according to claim 11, wherein:
for the region of interest (ROI) the recorded point set is adapted by increasing the point density within the region of interest (ROI).

13. The method according to any one of claim 11, wherein:
a second recording is effected in accordance with a second scanning pattern and second scanning region, wherein
the second scanning region is defined depending on the region of interest (ROI), the second scanning pattern is closer-meshed than the first scanning pattern, and the object points recorded in this case are taken into account in the adaptation of the recorded point set.

14. The method according to claim 9, wherein:
the information gain indicator is determined on the basis of the estimated object surfaces depending on a variance of normal distances of object points of a neighborhood set with respect to the object surface estimated with respect thereto.

15. The method according to claim 1, wherein:
the recorded point set is divided into individual point sets and the adaptation is effected for each of the individual point sets.

16. The method according to claim 1, wherein:
the quality of the measurement values of a respective object point is taken into account in the adaptation.

17. The method according to claim 1, wherein:
the quality of the signal-to-noise ratio of the distance determined of a respective object point is taken into account in the adaptation.

18. The method according to claim 1, wherein the surveying system comprises a laser scanner or a total station.

19. The method according to claim 1, wherein:
the adaptation is effected by the point density itself being reduced by thinning out and/or averaging within at least one predetermined partial region of the scanning region in accordance with predetermined selection criteria.

20. A non-transitory computer program product, stored on a machine-readable carrier, comprising program code suitable for carrying out the method according to claim 1.

21. A surveying system with scanning functionality, the surveying system comprises a control and evaluation unit configured to
scan objects by continuously changing the alignment of the measurement beam in accordance with a known first scanning pattern and first scanning region,
determine the respective distance to the object point and the respective alignment of the measurement radiation emitted for a distance measurement, wherein:
the recorded point set of the detected object points is kept available in a volatile memory of the control and evaluation unit and prior to storage in a permanent memory by means of the control and evaluation unit as part of the scanning process an adaptation of the recorded point set is effected depending on at least one point density of the recorded point set, as a result of which an adapted point set is generated, and, along with final loss of the recorded point set, only the adapted point set is stored in the permanent memory,
wherein ascertaining at least one point density indicator for the recorded point set is effected on the basis of the determined distances and alignments and the adaptation is effected depending on the point density indicator.

* * * * *